TAPE STAPLING

Filed Sept. 10, 1953 6 Sheets-Sheet 1

INVENTOR.
Charles W. Abbott
BY Watson, Johnson, Leavenworth & Blair
ATTORNEYS

Aug. 13, 1957 C. W. ABBOTT 2,802,321

TAPE STAPLING

Filed Sept. 10, 1953 6 Sheets-Sheet 2

INVENTOR.

Charles W. Abbott

BY Watson, Johnson, Leavenworth & Blair

ATTORNEYS

Aug. 13, 1957 C. W. ABBOTT 2,802,321

TAPE STAPLING

Filed Sept. 10, 1953 6 Sheets-Sheet 3

INVENTOR.

Charles W. Abbott

BY Watson, Johnson, Leavenworth & Blair

ATTORNEYS

INVENTOR.
Charles W. Abbott
BY Watson, Johnson, Leavenworth & Blair
ATTORNEYS

INVENTOR.

Charles W. Abbott
BY Watson, Johnson, Leavenworth & Blair
ATTORNEYS

Aug. 13, 1957 C. W. ABBOTT 2,802,321

TAPE STAPLING

Filed Sept. 10, 1953 6 Sheets-Sheet 6

INVENTOR.

Charles W. Abbott

BY Watson, Johnson, Leavenworth & Blair

ATTORNEYS 2,802,321
Patented Aug. 13, 1957

2,802,321

TAPE STAPLING

Charles W. Abbott, Larchmont, N. Y., assignor to Minnesota Mining & Manufacturing Company, St. Paul, Minn., a corporation of Delaware Application September 10, 1953, Serial No. 379,379

14 Claims. (Cl. 53—3)

The present invention is concerned with the art of withdrawing adhesive tape from a continuous supply source, separating off sections thereof and applying the sections to the packaging of small objects and particularly the mounting of such objects on a supporting member such as a display card.

In accordance with the principles of the invention and a particular application thereof, adhesive tape of the known tacky pressure-sensitive type is drawn from a supply roll, predetermined lengths are successively measured off, severed from the continuous supply strip, and compressed upon one or more objects positioned on a supporting card and the ends of the tape folded around the object through openings in the supporting card extending to the back of the card where the ends are compressed against the back of the card and preferably overlapped a small amount, in the manner of a staple. The mounted object is therefore locked on the card by direct contact with the object of a relatively large area of the tacky adhesive surface of the tape and by further areas of the tacky surface being sealed against flat under surfaces of the card and, if desired, with the tape ends overlapped.

The apparatus includes as one of the features of importance a tape feeding means comprising an endless conveyor having spaced transverse bars each provided with a serrated blade means projecting a limited distance from the bar surface and adapted to entrain the tape and advance it, the blade means also functioning as a perforating media for parting the leading tape section in any required length. Other features of importance reside in the character and manner of functioning of the means for folding the tape around the object. Of marked importance are the character of the various elements and their relation to each other whereby the apparatus may be readily adapted to handle objects of different sizes and shapes and to present and apply sections of tape of a selected size appropriate to the character of the particular object. Various other novel features of the apparatus will be made apparent from the more complete description of the particular form disclosed as illustrative of the invention in that regard.

The apparatus and process are marked by simplicity, ease and speed of operation and the rapid manipulation of wrapping tape of the pressure-sensitive adhesive type, which is a material heretofore known to be almost impossible to handle in display card mounting of countless small articles of merchandise.

The resulting combined article is superior to and has outstanding advantages over previous ones of a generally similar nature. Means of mounting articles on display cards heretofore provided have been subject to a great variety of defects and inconveniences. The various punched or slotted holes or tabs, formed in display cards, have failed to hold the articles securely, are easily torn and require meticulous time consuming operations in their production and assembly. The present resulting article also avoids the defects of metal fastening means such as clips, twisted wire, wire staples or wire reinforced tapes and the like which often cut into the display card and becomes loose.

A particular advantage exhibited by the present invention is the ability to mount and securely hold objects which are round, oval or irregular in form and as to which previous mounting devices and methods have been generally ineffective and unsuccessful as a practical matter. A difficulty generally exhibited by prior devices is the case with which the articles may be loosened and removed from a supporting card in shipment or ordinary handling, resulting in confusion and inconveniences and often theft of the articles. In contrast thereto the characteristics of the present holding means are such as to render accidental or unauthorized removal of the objects difficult and readily noticeable.

In the above discussion reference is made to the mounting of individual articles on a support, but from a consideration of the principles of the applicator means hereinafter disclosed in more detail it will be made apparent that such principles are capable of utilization in bundling or wrapping objects together and in a great variety of other uses not specifically illustrated.

The invention accordingly comprises the several steps and the relation of one or more of such steps with respect to each of the others, and the apparatus embodying features of construction, combinations and arrangement of parts, adapted to effect such steps, all as exemplified in the detailed disclosure hereinafter set forth, and the scope of which invention will be indicated in the claims.

For a fuller understanding of the nature and objects of the invention reference should be had to the following detailed description taken in connection with the accompanying drawing, in which.

Figures 1, 5:
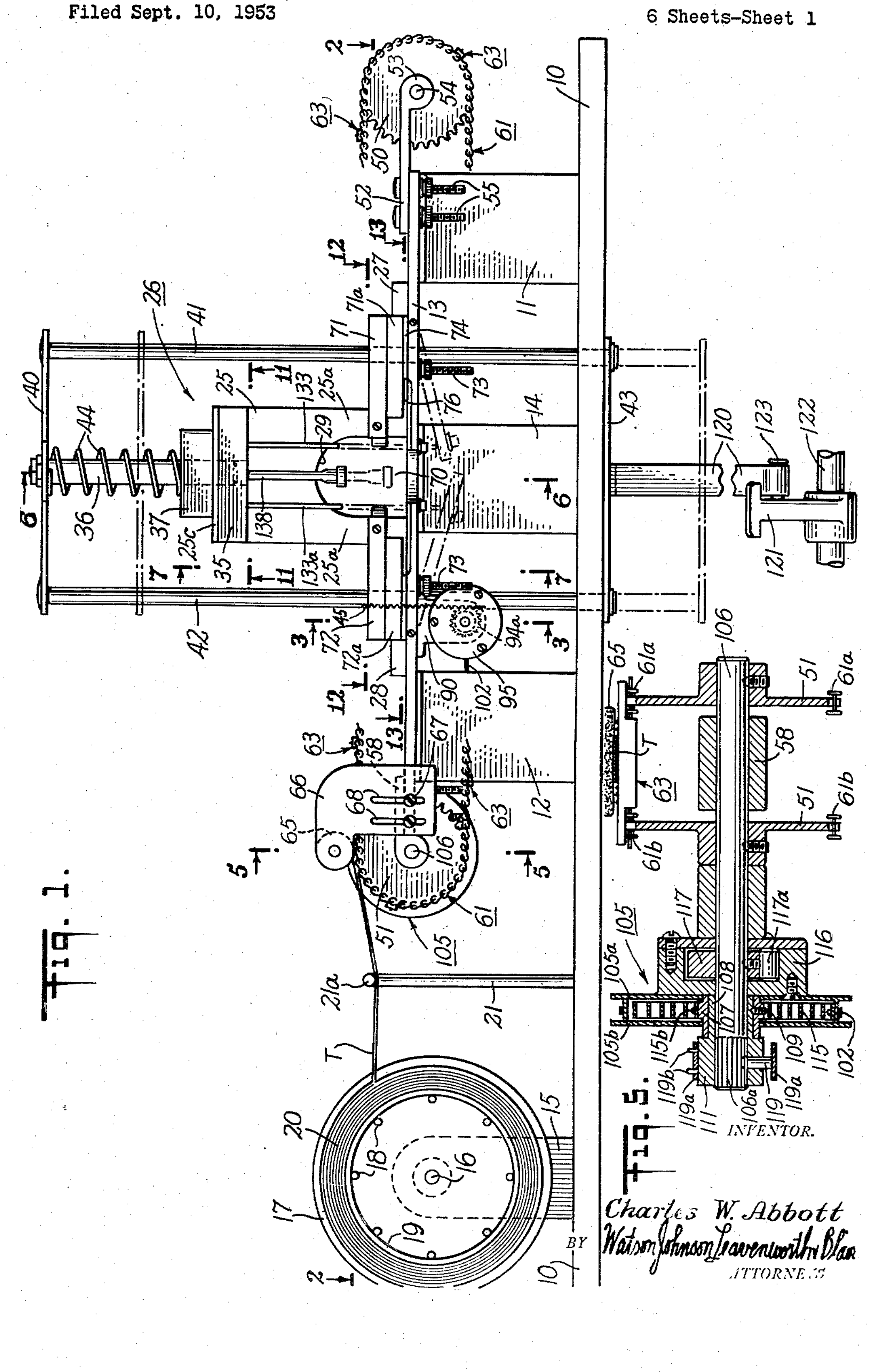
Fig. 1 is a view in elevation of a complete applicator machine looking from the front thereof.
Fig. 5 is a vertical section taken on the line 5—5 of Fig. 1 showing details of the sprocket rotating means.
Figure 2:
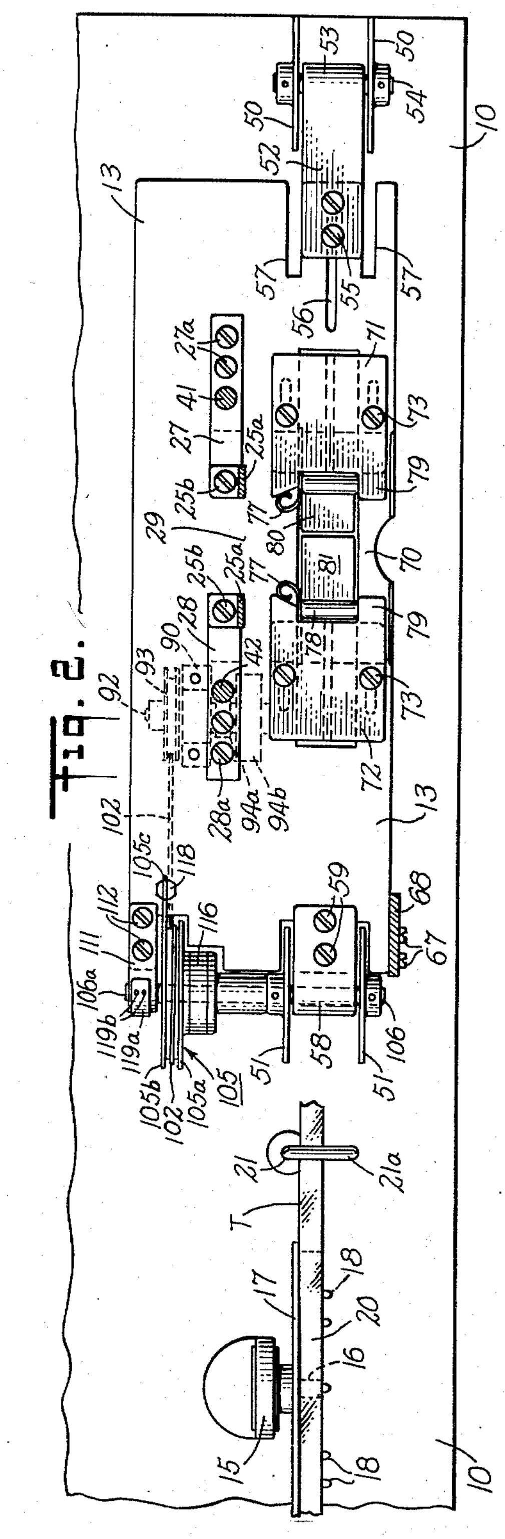
Fig. 2 is a plan view taken on the line 2—2 of Fig. 1 and therefore partially in section.

The complete assembly of the present embodiment of the invention is shown particularly in Figs. 1 to 2. The main features of the apparatus include a base plate 10 upon which are mounted two vertical end supports 11 and 12 which have upper horizontal flange portions upon which is mounted a table 13. The table supporting means includes also a similar vertical middle bracket 14. At the extreme left end the base plate 10 is provided with a vertically extending supporting bracket 15 which at the upper end has a bearing for a shaft 16 at the forward end of which is mounted a circular plate 17 having peripherally spaced pins 18 upon which the annular core 19 of a roll of pressure-sensitive adhesive tape 20 is adapted to be mounted. The individual strand or tape T is shown extending to the right from the roll 20 of Figs. 1 and 2. Extending upwardly from the base 10 is a post 21 having suitable means at the upper end thereof for guiding the tape T comprising in the present instance a right angular horizontal portion **21*a* under which the tape rides. The bar 21*a*** ensures that the tape will be directed to the tape feeding means at a constant angle and ensures proper engagement of the tape strand with transfer bars of the flexible conveyor which will be described more fully below.

Projecting upwardly at the rear edge of the table 13 is a bracket 25 in which is mounted a vertically reciprocable plunger mechanism indicated generally at 26. The support for the bracket 25 includes a pair of bars 27 and 28 secured to table 13 by set screws **27*a* and 28*a* respectively (Fig. 2). The opposed ends of the bars are spaced apart a distance corresponding to the opening 29 (Fig. 1) provided between the spaced bottom legs 25*a* of the bracket 25 and the legs 25*a* have right angle bottom flanges resting on the respective ends of the bars 27 and 28 and secured thereto by suitable assembly screws 25*b*. The opening 29 enables articles to be readily moved through the apparatus from front to back. As indicated in Fig. 6 the opposed ends of the bars 27 and 28 are off-set upwardly to provide a space 30** through which supporting cards may be positioned and moved rearwardly or inserted from the back of the machine.

Figure 6:
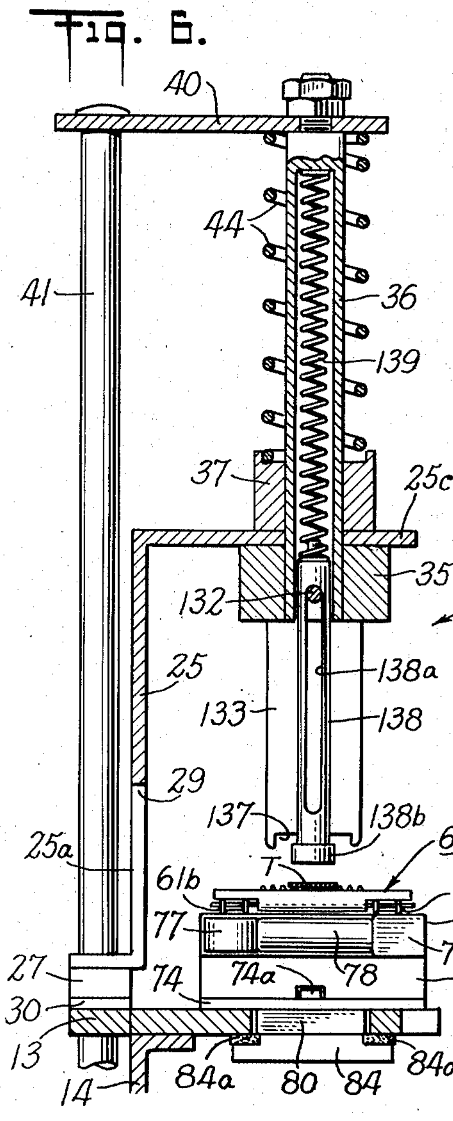
Fig. 6 is a vertical section taken on the line 6—6 of Fig. 1 and showing particularly the plunger mechanism.
Figure 11:
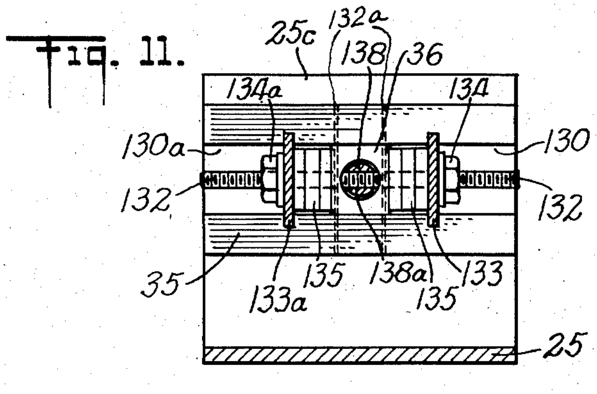
Fig. 11 is a fragmentary view of the plunger shoe looking upwardly in accordance with the line 11—11 of Fig. 1.

The reciprocable plunger mechanism 26 includes a channel shaped block 35 in which is secured an upwardly extending hollow sleeve 36 which is square in cross section and has a press fit in a correspondingly shaped opening in block 35 and may be additionally secured in place as by suitable welding (Figs. 6 and 11). The sleeve is vertically reciprocable in an opening in a horizontal flange portion **25*c* of the supporting bracket 25 and a corresponding opening in the fixed block 37 mounted on the upper surface of the flange 25*c*. Bolted to the upper end of the sleeve 36 is a T-shaped yoke 40 and secured at the opposite ends of the yoke and welded thereto are a pair of draw bars 41 and 42 which extend through and are vertically guided in openings in the respective bars 27 and 28 and also corresponding openings in the table 13 and base plate 10. The lower ends of the bars 41 and 42 are connected by a lower yoke or plate 43. The rectangular framework resulting from the vertical bars 41 and 42 and the yoke plates 40 and 43 is normally urged to its upper position by the compression spring 44 encircling the hollow shaft 36 between the yoke 40 and the stationary block 37. The vertical bar 42 is provided with a gear rack section 45** adapted to operate a spur gear which in turn is connected to operate the tape feeding means through mechanism which will be described hereinafter. Tape folding elements movable with the plunger head will also be described later herein.

Referring now to the main table 13 and the tape conveyor mechanism, the table at each end carries a pair of spaced sprockets 50 and 51 respectively. The supporting means for the sprockets 50 at the right embodies a plate 52 having a bearing 53 for the shaft 54 upon which are mounted the sprockets 50. As indicated particularly in Figs. 2 and 14 the bearing plate 52 for the sprockets may be adjusted longitudinally of the table 13, the clamping means comprising a pair of bolts 55 securable in selected position in the slot 56 of the table 13, the table being provided with additional slots 57 to accommodate the sprockets 50 in selected positions. Various additional adjustments to adapt the apparatus for different articles will be described later herein. The pair of sprockets 51 at the left are similarly carried by a plate 58 secured by a pair of bolts 59 to the table 13.

Figures 8, 9:
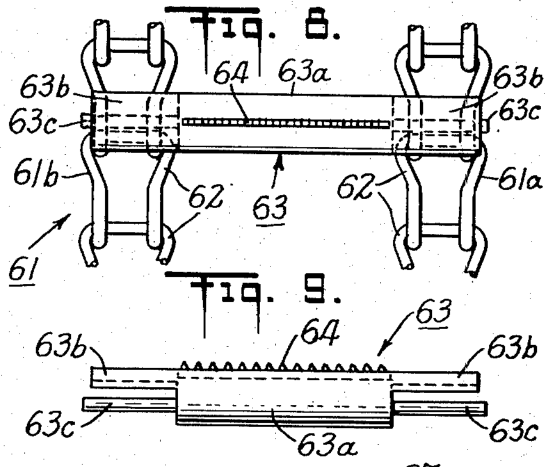
Fig. 8 is a top plan view of one of the conveyor bars.
Fig. 9 is a side view of a conveyor bar.
Figure 10:
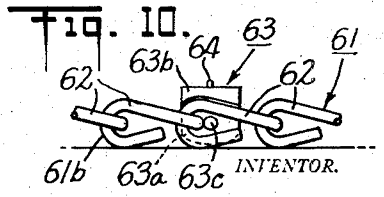
Fig. 10 is a view of a section of the tape conveyor looking from the side and, therefore, toward the end of a conveyor bar.

The tape conveyor indicated generally at 61 includes a pair of spaced flexible strands **61*a* and 61*b* (Fig. 6) each comprising a chain of separable individual links 62 as shown more particularly in Figs. 8 and 10. The conveyor has mounted thereon a plurality of transverse bars 63 arranged in a predetermined pattern of spacing, which will be described in more detail hereinafter. The preferred form of the bars 63 shown includes a mid portion 63*a* of enlarged cross sectional area having a rounded bottom face adapted to ride on supporting surfaces. A finger portion 63*b* projects from the body portion at each end. The upper surface of the bar which extends over the body and finger portions is generally flat. Located below each finger portion 63*b* is a pin 63*c* extending from the body portion 63*a* longitudinally of the bar. The pins 63*c* are adapted to extend into the loops of the respective chain links 62 and the under surface of the fingers 63*b*** rests upon the surface of the link as indicated in Fig. 10.

Preferably the under surfaces of the finger **63*b* are shaped to conform closely to the contour of the link. Arranged longitudinally of each bar 63 and extending upwardly from the top surface is a saw toothed or serrated element 64 which is provided by securing a suitable serrated blade in a slot extending downwardly in and along or partly along the surface. The construction of the bars is such that they may be readily removed and inserted at any desired pair of links by merely slightly spreading apart the chains to permit disengagement and re-engagement of pins 63*c***.

The tape is fed by being entrained on the teeth of the serrated blades. A flexible means is employed for initially compressing the tape thereon. Such a means is shown in Fig. 1 comprising a roller 65 of soft rubber supported over the sprockets 51 by a bracket 66 adjustably secured to the side edge of table 13 by screws 67 received in slots 68 in the bracket 66.

The serrated blade means and its relation to the supporting bar 63 are of such character that the points of the teeth penetrate the tape sufficiently to ensure against any slippage of the tape in cooperation with adjacent top surfaces of the bar and to effect the advance thereof from the supply roll but the tape is not cut apart in such operation. The teeth project a small distance only beyond the surface of the bar whereby the latter limits the extent to which the tape is compressed by the roller onto the teeth. The surface so functions even though the teeth project therefrom a distance considerably more than the thickness of the tape. This distance may vary within a range of .010 to .020 inch dependent upon the circumstances including the spacing of the teeth. With normal triangular saw teeth the greater the distance of projection the greater the spacing should be, and preferably the gullets of the teeth should be even with or slightly below the surface of the bar so that even if the tape were compressed down to contact completely the supporting surface with the teeth projecting through the tape, the tape would be entrained on spaced points only and not completely severed along the line of the teeth.

Figure 14:
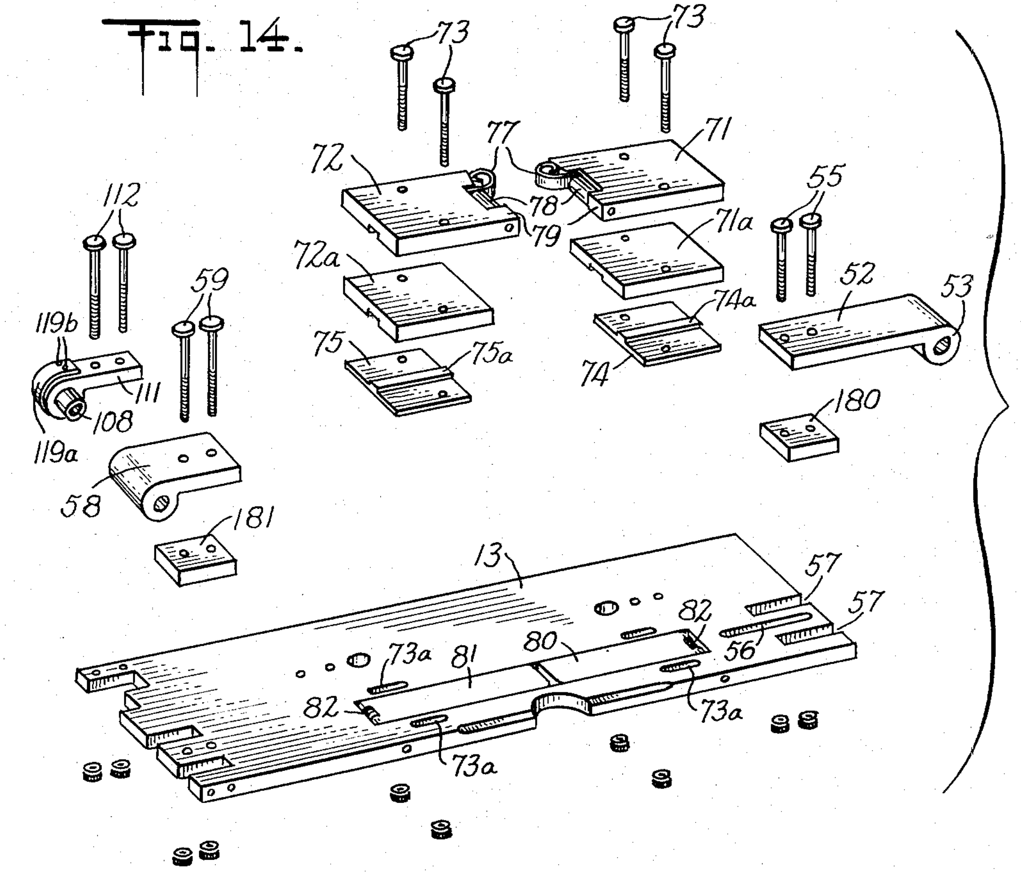
Fig. 14 is an exploded view in perspective of the main table and various associated spacing blocks and bearing means illustrating the adaptability of the applicator to different sizes and types of articles.

The table embodies an article station or space indicated generally at 70 defined particularly by a pair of blocks 71 and 72 mounted on the table 13 by suitable means such as the bolts 73 shown most clearly in Figs. 1, 2 and 14. Means are provided for readily adjusting the upper level of the blocks 71 and 72 to a position suitable to the height of the particular articles to be inserted in the space 70 for the application of tape. For this purpose spacer blocks of desired thickness may be inserted under each block 71, 72. As shown in the present embodiment in Figs. 6 and 7 and also in the exploded view of Fig. 14 the arrangement includes card spacer plates 74 and 75 resting on the table 13, spacer plates **71*a* and 72*a* resting on the card spacer plates 74 and 75 respectively, and the upper blocks 71 and 72, all held clamped to the table by the bolts 73. Slots 73*a* in the table 13 (Fig. 13) through which the bolts extend enable the plates and blocks to be adjusted to vary the width of the opening 70 to accommodate articles of different size. Preferably the card spacer plates 74 and 75 are provided on their upper surface with a flat rib 74*a* and 75*a* (Fig. 14) respectively and the corresponding superposed plates 71*a* and 72*a* each have a channel into which the rib fits. The plates 74 and 75 are relatively shorter than the overlying plates and blocks to provide thereby a slot 76 communicating with the open space 70** adapted to receive a card upon which the article is to be mounted.

Figures 12, 13:
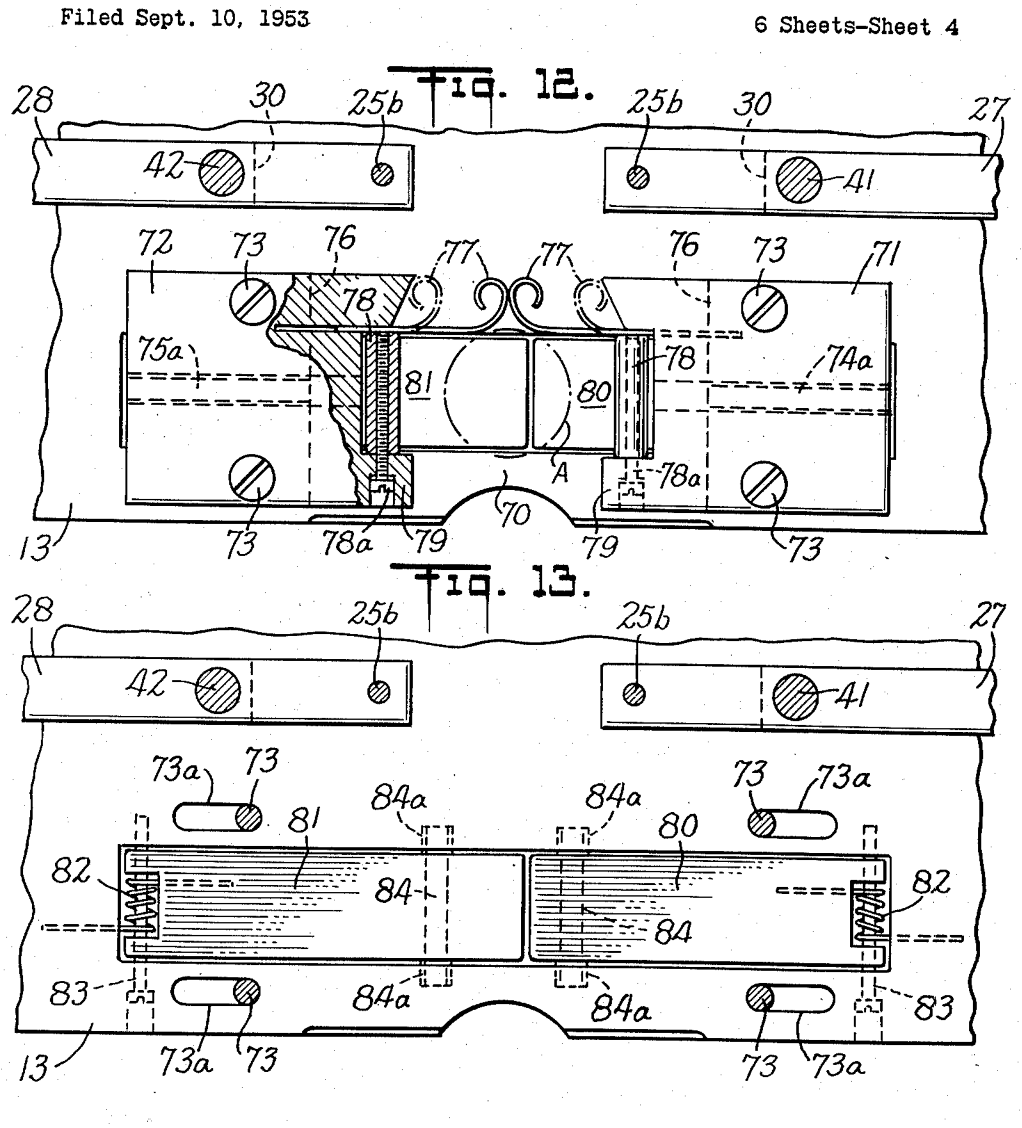
Fig. 12 is a fragmentary plan view taken on the line 12—12 of Fig. 1 showing particularly the article positioning means.
Fig. 13 is a sectional plan view on the line 13—13 of Fig. 1 showing particularly the trap doors in the table.

The article station 70 is further defined by a pair of metal strip spring members 77 shown particularly in Fig. 12 which are mounted in slots in the respective blocks 71 and 72. The opposed edges of the two blocks also each carry a roll 78 over which the tape is adapted to ride and its movement facilitated as it is pushed down upon the article positioned in the station 70 as will be later described. The rolls are each rotatable on and held in a notch in the respective block by a screw pin **78*a* threaded through an outer ear 79 in the respective blocks 71 and 72 and the inner end of the screw is adapted also to bear against and clamp the respective spring 77** in selected position. In Fig. 12 the springs are shown in full line in their extreme inwardly adjusted positions and in broken line in their extremely outwardly adjusted position. The springs serve to locate an article positioned in the operating station such as that indicated at A in Fig. 12, but are sufficiently flexible such that the article may be pushed on through from front to back or vice versa if desired.

As shown particularly in Fig. 13 the table has mounted therein at the operating station a pair of tape wiping members in the form of trap doors 80 and 81 normally held in upward closed position by coil springs 82 encircling the door supporting pins 83, the movement of the doors in the closing direction being limited by a bar 84 secured to the lower face of each door having projecting fingers which engage against the under surface of the table 13. Preferably the bars 84 are provided at each end with rubber bumper pads **84*a*** where they engage the table (Figs. 6 and 7) to effect a firm engagement of tape ends with the bottom face of cards upon which articles are mounted.

Figure 3:
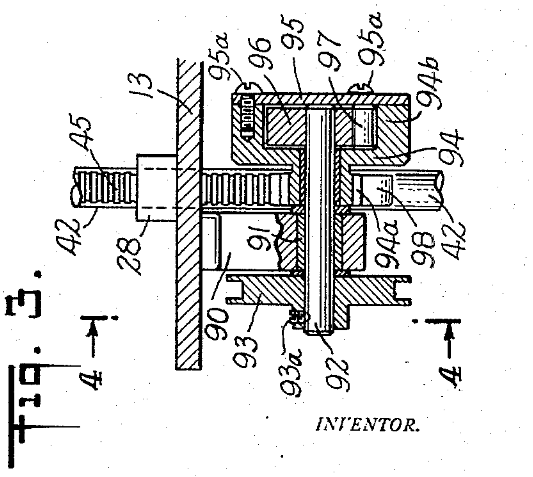
Fig. 3 is a vertical cross-sectional view taken on the line 3—3 of Fig. 1 showing particularly the clutch mechanism for the tape feed.

The means for intermittently advancing the tape predetermined distances to provide corresponding sections to be applied to the articles will now be described. This mechanism is shown best in Figs. 1 to 4. A bearing bracket 90 secured to the under surface of table 13 has therein a bearing bushing 91 for supporting a rotatable shaft 92 (Fig. 3). Mounted on the outer end of shaft 92, that is the left end in Fig. 3, is a sheave 93 secured to the shaft by a set screw **93*a* in the sheave hub. Associated with the opposite end of the shaft 92 as shown in Fig. 3 is a one-way acting clutch which includes a housing member 94 rotatable on the shaft. The left end of the member has formed thereon a spur gear 94*a* and the right end has an enlarged hollow head 94*b* comprising the driving member of the clutch. The head is provided with a cover plate 95 secured thereto by screws 95*a*. Mounted within the head 94*b* and secured on the shaft 92 is the driven clutch member 96. The gear rack 45 on vertical bar 42 is adapted to mesh with and thereby rotate the gear 94*a*. The clutch is in principle a well known type and includes a series of tapered notches in the periphery of the driven member in each of which is located a ball or roller 97, and it will be understood that, in accordance with the well known characteristics of the type of clutch shown, upon rotation of the driving clutch member 94 in the clockwise direction in Fig. 4 the rollers 97 will move outwardly and cause the inner driven clutch member 96 to rotate with the outer head 94*b*, but upon reverse movement of the driving member 94 the inner member 96 will be released. Accordingly upon downward movement of the bar 42 the driving clutch member 94*b* will rotate freely about the member 96 but upon reverse movement with the bar 42 moving upwardly the member 96 and thereby shaft 92 and sheave 93 will be rotated in the clockwise direction in Fig. 4. For a purpose to be described shortly, it is noted that at the lower end of the rack 45 the bar 42 is provided with a blank cut out portion 98 and accordingly in the uppermost position of the bar 42 the gear 94*a*** is free to rotate without engagement with the rack.

Figure 4:
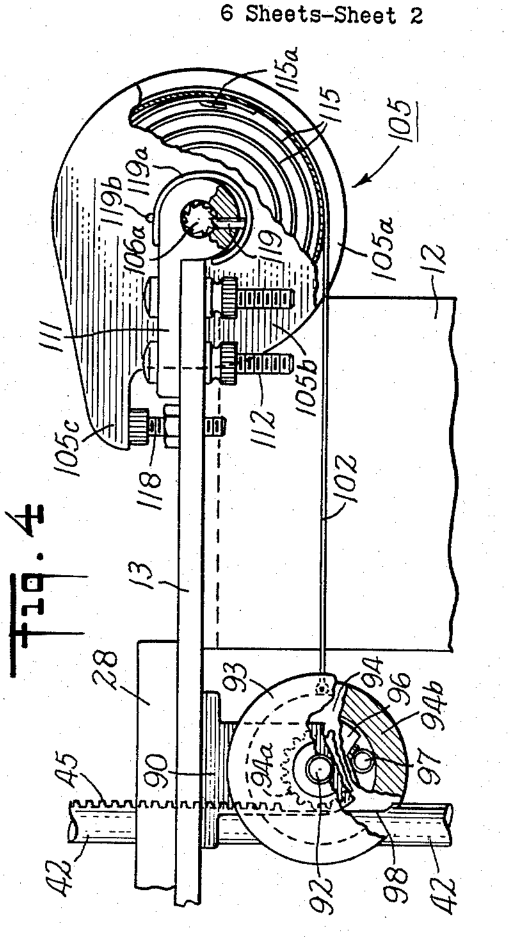
Fig. 4 is a vertical view looking in the direction of the arrows 4—4 of Fig. 3 and therefore from the rear of the machine.

The pulley 93 has secured thereto one end of a flexible operating strip 102 which upon clockwise rotation in Fig. 4 of the pulley is adapted to be wound thereon. Preferably the strip 102 is a flat band of material such as metal which is non-variable in length. In Fig. 4 the pulley is shown in its extreme unwound position. The strip 102 extends to the right in Fig. 4 and is designed to operate a drum 105 which in turn is connected to rotate the shaft 106 upon which are secured the two chain sprockets 51 (Fig. 5). The drum 105 is hollow and includes two side plates **105*a* and 105*b* rotatable on reduced diametral portions of a stationary bearing sleeve 107 secured to stationary sleeve 108 by a set screw 109. The sleeve 108 is integral with a bearing bracket 111 secured to the table 13 by screw bolts 112. Housed within the drum 105 is a spiral spring 115 the outer end of which is secured to the drum at 115*a* and the inner end of which is secured at 115*b* to sleeve 107 and, therefore, held stationary. The drum has associated therewith a one-way clutch means which may be similar to the clutch associated with the sheave 93. As shown in Fig. 5 the drum plate 105*a* has secured to the side thereof a clutch driving member 116, enclosing a driven clutch member 117 and cooperating clutch rollers 117*a*. The winding of metal tape 102 on sheave 93 rotates drum 105 clockwise in Fig. 4 increasing the tension upon spiral spring 115. When the sheave 93 is released as the bar 42 reaches its uppermost position, spring 115 rotates drum 105 counterclockwise in Fig. 4, unwinding the strand 102 from sheave 93, and through the clutch members 116 and 117 rotating shaft 106 and sprockets 51**, thereby advancing the adhesive tape a predetermined distance.

The return rotation of drum 105 by spring 115 just described is limited by a suitable stop means comprising in the present apparatus a finger **105*c* integral with the side 105*b* of the drum and adapted to engage against a set screw 118 mounted on table 13 as shown particularly in Figs. 2 and 4. Creeping of the shaft 106 in the reverse direction, that is opposite to the tape feed, is prevented by a pawl and ratchet means located at the inner end of the shaft and comprising a small ratchet wheel 106*a* formed on an extension of the shaft and a pawl 119 urged into engagement with the ratchet teeth by a curved leaf spring 119*a* secured by pins 119*b* to the bracket 111. To avoid over running of the sheave 93 and the forming of slack in the strand 102** when the parts reach the position of rest at the end of a cycle shown in Fig. 4, the end of the flat metal wire 102 is preferably attached to sheave 93 at a point as shown in Fig. 4 and of a length to be completely unwound from the sheave.

The complete operation in advancing the adhesive tape a predetermined distance may be summarized as follows: It will be assumed that the forward end of the tape lies on the upper run of the conveyor and extends past the operating station 70. The frame embodying the bar 42 is moved downwardly. This may be accomplished manually or automatically. As shown in Fig. 1 an operating link 120 is connected to the cross bar or yoke 43, which may be operated by any suitable means either manually or by power such as by a solenoid. In the particular form shown the operating means comprises a foot treadle 121 pivoted on a rod 122, the lower end of link 120 being pivotally attached at 123 to an intermediate point of the lever 121. Depressing the treadle effects the separation and application to the article of the forward section of the tape as will be described more fully. For the present it is noted that pulling down bar 42 causes the rotation of pinion 94*a* (Fig. 3) by rack 45. This rotates clutch driving member 94*b* counterclockwise in Fig. 4 but the sheave 93 remains stationary. Upon release of the foot treadle the bar 42 moves upwardly under the force of spring 44 and upon the corresponding reverse rotation of clutch driving member 94*b* the clutch is effective to rotate sheave 93 winding strand 102 thereon which rotates drum 105 clockwise winding up spring 115. In this operation the shaft 106 remains stationary. Just before the bar 42 reaches its uppermost position the rack 45 moves free of the pinion 94*a* by reason of the blank space 98 whereupon the spring 115 rotates drum 105 counterclockwise in Fig. 4, and through the one-way clutch 116, 117 rotates shaft 106 and sprockets 51 clockwise in Fig. 1, advancing the conveyor 61. This movement continues until finger 105*c* on drum 105 engages set screw 118 in the stop position shown in Fig. 4.

A particular advantage of the advancing means just described resides in the fact that driving pulley 93 may be readily removed and replaced by another of different diameter and adapted, therefore, to advance the tape a correspondingly different length appropriate in each case to the particular article being assembled. It is important that the tape be advanced the correct distance each time and properly positioned relative to the plunger mechanism 26 for applying the forward section to the article. It is possible for a slight error or misadjustment in the tape advancing means to produce over a period of many cycles a substantial accumulative error in the advanced position of the tape. The fine adjustment, provided by the stop screw 118, however, enables the operator to correct such departure.

There has been described above one particular form of mechanism for successively advancing the tape predetermined distances. It will be understood, however, that such mechanism is one element of the general combination and that other mechanisms could be embodied for the purpose, and that such mechanisms could vary from, for example, a simple hand crank and ratchet means attached to one of the sprocket axles to a fully automatic power actuated means.

Figure 7:
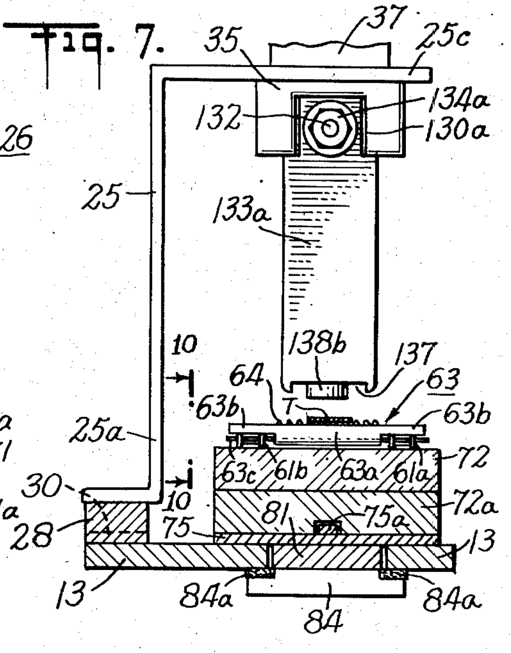
Fig. 7 is a fragmentary section taken on the line 7—7 of Fig. 1 showing further details of the plunger mechanism.

The details of the plunger mechanism 26 for applying the sections of tape to articles will now be described. Referring particularly to Figs. 6, 7 and 11 it will be noted that the plunger block 35 has in the bottom face two channel openings 130 and 130*a* separated by the lower end of the square sleeve 36 through which extends and is supported a bolt 132 screw-threaded on each end and locked in position by cross pins 132*a* (Fig. 11). Depending from the supporting block 35 are two tape threading plungers or blades 133 and 133*a* (Fig. 1) each having an upper narrowed portion adapted to fit within the channel 130 or 130*a* with shoulder portions engaging against the bottom face of block 35 as indicated particularly in Fig. 7. The bolt 132 extends through holes in the upper ends of the blades and the blades are each clamped in position by a nut 134 and 134*a* respectively. As shown particularly in Fig. 11 spacer washers 135 are located between each blade and the lower end of sleeve 36. The construction is such, therefore, as to permit the ready removal of the blades and the substitution of different ones adapted for different articles. Furthermore the number and thickness of the washers 135 may be easily varied to provide different positions of the blades and differen spacings between them appropriate to a particular article.

A feature of the tape threading blades or plungers 133 and 133*a* which has considerable functional importance, as will be described in connection with an operating cycle, is the provision of a pair of spaced projecting fingers on the lower end resulting in an intervening notch shown particularly in Fig. 6 at 137 adapted to receive therein the tape and having a width greater than the widest tape likely to be employed. As a result in the application of the tape to an article it slides freely through the notches and the spaced fingers mechanically engage the trap doors 80 and 81 respectively thereby avoiding the engagement of the sticky surface of the tape with the doors.

Located between the tape threading plungers or blades 133 and 133*a* is a tape presser member or applying plunger 138 provided with a vertical slot 138*a* through which extends the screw pin 132 which limits the downward movement of the presser member, the presser member being urged downwardly by a coil spring 139 compressed within the hollow interior of the upper sleeve 36. The presser member preferably has an enlarged foot portion 138*b*. The relationship is such that the bottom of the foot portion extends as low as and preferably slightly lower than the bottom end of the blade 133*a* which in the present mechanism is shown as somewhat longer than the blade 133, for a purpose to be described. Accordingly in the downward movement of the plunger mechanism the presser member 138*b* engages the tape and compresses it onto the article slightly in advance of the engagement of the tape by either of the threading blades, thus preventing side movement or displacing of tape under pressure of the longer blade 133*a*.

As previously described the tape conveyor 61 carries a plurality of transverse bars 63 that are spaced apart a predetermined uniform distance equal to the desired length of the successive sections of tape to be severed and applied to an article. The conveyor must have a length, therefore, which is a multiple of such distance. The present apparatus enables this to be accomplished very readily since the wire chain links are easily opened and separated to adjust the total length and the bars 63 may be mounted at any appropriate pair of links. As also previously described the chain sprockets 50 are adjustable longitudinally of the table over ample distance to accommodate any length of conveyor which would normally be employed. The sheave 93 upon which operating cord or flat wire 102 is cyclically wound may conveniently be changed and a sheave applied of a diameter appropriate to the length of the tape desired and correspondingly to the required distance of the intermittent advance of the conveyor.

Figure 15:
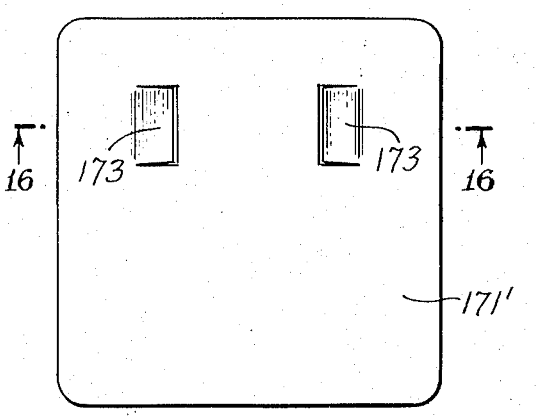
Fig. 15 is a plan view of a card suitable for the mounting thereof of appropriate articles.
Figure 16:
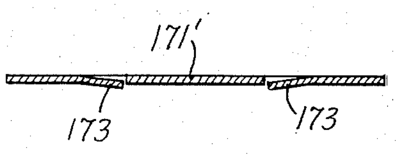
Fig. 16 is a cross-sectional view of the card on the line 16—16 of Fig. 15.

Having described the operating mechanism, a typical cycle of operation on a typical article will be described in connection with Figs. 17 to 21. It is assumed for example that it is desired to mount the round object 170 on a display card indicated at 171 in Fig. 21. Figs. 17 to 20 are intended primarily to illustrate the successive steps and are somewhat simplified particularly in omitting the spacer blocks 71*a* and 72*a*. Accordingly the upper run of the conveyor chain is lower than is shown in Figs. 1, 6 and 7 and the object 170 is of somewhat less height than objects for which the mechanism is intended as adjusted in Fig. 1. The card 171 has preformed therein a pair of openings 172 through which the ends of the tape will be threaded. These openings may be complete cut outs, or, as shown in card 171′ of Figs. 15 and 16, the openings may have hinged flaps 173 formed by cutting appropriate slits in the card. A section of tape T′ is to be applied locking the article 170 to the card in the manner shown in Fig. 21 with ends of the tape folded down against the back of the card, and in the preferred form shown, with the ends overlapped as indicated at 174.

Figures 17, 18, 19, 20:
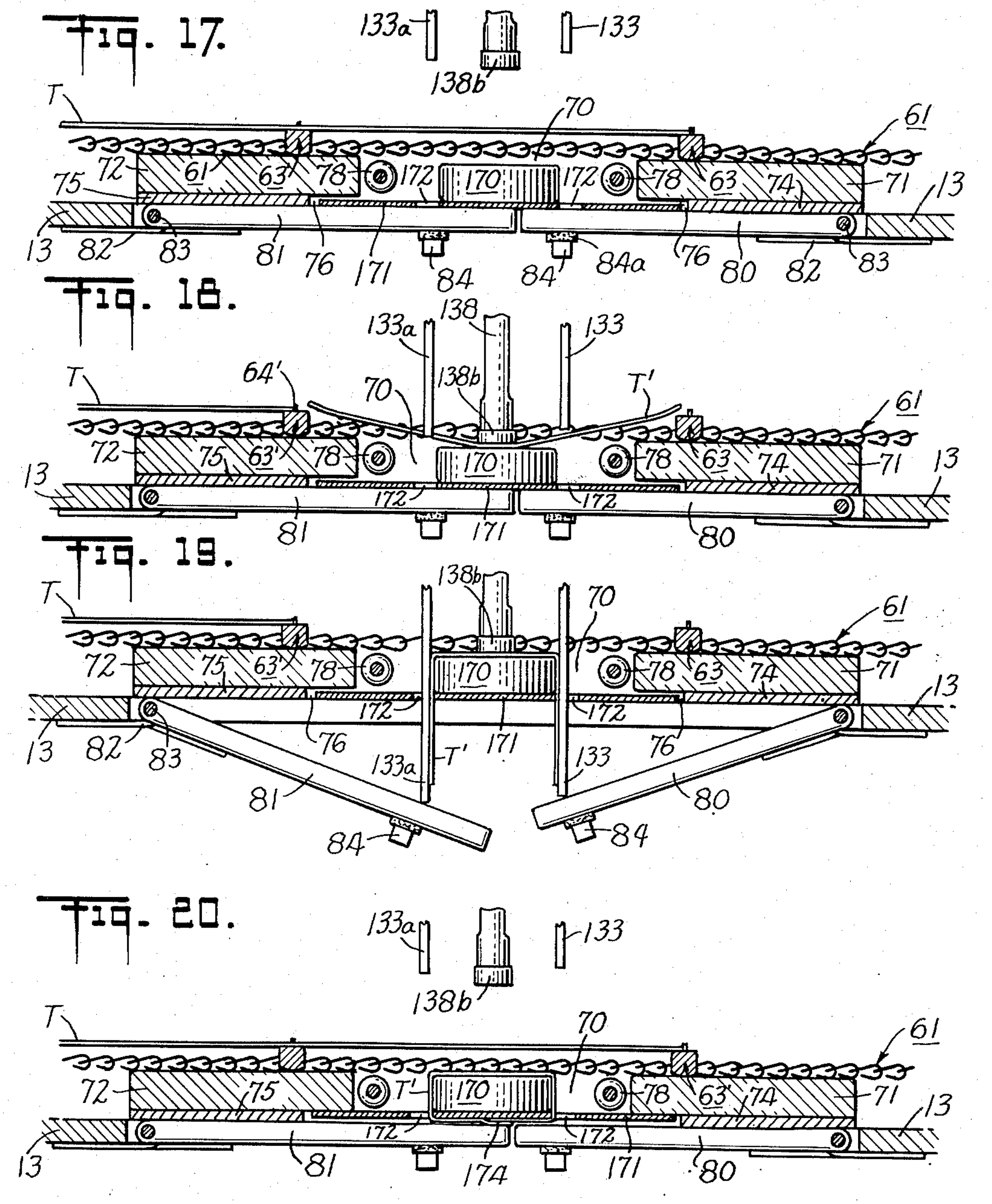
Figs. 17 to 20 are fragmentary views showing successive stages in the operation of applying a section of tape to an article; and, Fig. 21 is a view in perspective of an assembled article such as may be produced by the mechanism and succession of steps illustrated in Figs. 17 to 20.

It may be assumed that the tape T extends to the position shown in Fig. 17 with the forward end resting on and lightly attached to the surface of the corresponding bar 63. A card 171 is inserted extending into the slots 76 as shown in Fig. 17, and there is also inserted in the space 70 the object 170 resting on and occupying a given area of the top surface of the card 171. The flexible spring fingers 77 shown in Fig. 12, e. g., serve to limit temporarily the inward position of the object 170 and also to locate it appropriately in the space, and the adjustable spacers 74, 75 (Fig. 14) enable the card to be properly positioned. The plunger mechanism is then rapidly depressed by the means provided comprising in the present illustrative device the treadle 121 on which the operator steps. This results in the assembled article shown in Fig. 21 in the small fraction of a second but the sequence of events is pictured in the Figs. 17 to 20.

Fig. 17 shows the article parts in position and the tape advanced to the appropriate position. When the plunger mechanism is pushed downwardly, the first event that occurs is a compressing or applying of the tape onto the upper surface of the object 170 by the foot **138*b* of the tape applying plunger 138, where it is held under the force of the spring 139 (Fig. 6). Concurrently or immediately following this the longer tape threading plunger or blade 133*a* moving at a relatively rapid rate impinges upon the upper surface of the tape and causes it to be separated upon serrated blade 64′. As the plunger mechanism proceeds downwardly, the shorter tape threading plunger or blade 133 also engages the tape and the mid portions of the severed section T′ are folded down against the side edges of the object 170, the free ends of the tape section are pushed or threaded down through the openings 172 of the card and the trap doors 80 and 81 are pushed open (Fig. 19). In advancing from the position of Fig. 18 to that of Fig. 19 the tape occupies a position in the notch 137 at the lower end of the corresponding blade and accordingly as the projecting fingers of the blade engage against the trap door 80 or 81 the tape slides through the notch and the effect is avoided of the tacky tape surface being compressed against the upper surface of the trap door. The threading blades 133 and 133*a* are shown in substantially their lowermost position in Fig. 19. As they begin to retract upwardly under the force of spring 44 (Fig. 6) the trap doors or wiping flaps 80 and 81 swing inwardly and upwardly, folding or "wiping" the ends of the tape up against the card as shown in Fig. 20 resulting in the completed article shown in Figs. 20 and 21. There is no tension on the remaining forward end of the tape T and it remains lightly attach to the upper ledge surface of bar 63′** as indicated in Fig. 19. Immediately following the retraction of the plunger the conveyor is advanced by the mechanism heretofore described to position the tape as shown in Fig. 17.

Figure 21:
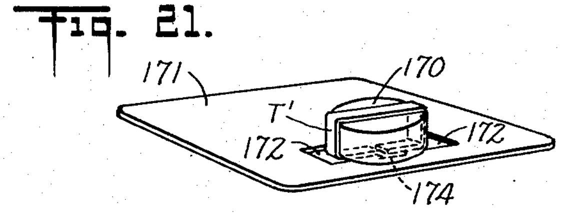

The particular embodiment of the invention shown is adapted to operate upon and fold a section of tape sufficiently long to overlap a small distance at the back of the card as shown at 174 in Fig. 21. For that purpose the blade 133 is made a little shorter than blade **133*a*, and also the free ends of the trap doors 80 and 81 when closed are offset to the right from the vertical center line of the plunger mechanism as it appears in Fig. 18 for example. Accordingly, since blade 133 is shorter, the door 80 moves to its closed upper position in advance of the door 81 and the end of tape at the right is wiped down first and immediately following the left end is wiped down with the extreme portion of the left end overlapping the other end, and, since the left door 81** extends substantially to the end of the corresponding tape part, the overlapping ends will be compressed together and against the back of the card. With the ends of the tape cemented together the result is in effect a closed loop and the securing means is exceptionally strong. It ensures against the condition which may occur when an inferior grade of supporting cardboard is employed having a soft pulpy back from which pressure-sensitive tape is more readily freed. Of course where the materials or conditions in general are such that overlapping of the tape ends is unnecessary, shorter lengths of tape having ends of equal length may be employed.

Apart from the economy and convenience of speed of assembling the article of which that in Fig. 21 is representative, the finished article itself has marked advantages. The object remains firmly clamped on the card under repeated handling. The tape because of its permanently tacky surface is not only firmly locked against the card but it also firmly engages the object such that it is practically impossible to shift the object laterally without completely rupturing the tape. Because of the transparent character of the tape the object itself and its surface including any decoration or printing thereon are unobscured. There are no fastening means such as clips or wires which have sharp exposed points and the fastening means is not subject to becoming loosened such as commonly occurs with stapling means and other metal fasteners with a small amount of handling.

The principle of the apparatus and the character of its design are such as to render it remarkably flexible in adapting it to the application of objects of different size and shape to different appropriate cards. As heretofore described the flexible chain link type conveyor and the adjustable mounting for the sprockets enable the over-all length of the chain to be varied to provide a multiple of the lengths of tape required with the bars 63 appropriately spaced.

The flexibility of the apparatus and its adaptability to objects of different size including different thicknesses are particularly indicated in the exploded view in Fig. 14. Objects of different thickness make it desirable that the upper run of the conveyor be positionable at different levels with respect to the top surface of the table 13 on which the objects are supported. This is readily effected by changing the vertical position of the conveyor sprockets with respect to the table 13, which may be accomplished by arranging the sprocket bearing plates 52 and 58 above or below the table and with the offset bearing portions 53 projecting upwardly or downwardly. Also spacer blocks such as those shown at 180 and 181 may be employed. A compatible location for the upper surface of the blocks 72 and 71 over which the conveyor rides may also be accomplished by the insertion of appropriate spacer blocks such as those indicated at 71*a* and 72*a*. The space 76 for the supporting card may be varied as to width by adjustment of bottom spacer plates 74 and 75. Adjustment of the various blocks including particularly the blocks 72 and 71 longitudinally of the table and relative to each other to accommodate objects of different width is easily effected by selective positioning of the clamping bolts 73 in the slots 73*a* in the table. Corresponding adjustments or changes of the plunger mechanism have been described previously.

The foregoing describes a typical embodiment of the applicator principles by way of a specific form of mechanism and resulting article but it will be appreciated that various other adaptations thereof may be made and that various features and principles may be utilized in different ways. The specific final article described above and shown in the drawing comprises a single object mounted upon a supporting card but the applicator means may be adapted to the mounting of a plurality of parts on a card or to the wrapping together of a plurality of objects, or to the fastening to a part of a label, for example. Accordingly when reference is made to the application of tape sections to an object or article it is intended to comprehend a single part or associated parts secured together as a final composite article. In general various changes and adaptations may be made in the process and in the product, and various specific forms of apparatus employed for practicing the principles thereof without departing from the scope of the invention, and it is intended that all matter contained in the above description or shown in the accompanying drawing shall be interpreted as illustrative and not in a limiting sense.

A species of the present invention is described and claimed in the application of Walter C. Larsen, John E. Ganshert and Walter Wanielista which was filed September 27, 1955, as Serial No. 537,012, and which issued April 16, 1957, as Patent No. 2,788,625.

I claim:

1. A mechanism for taping an object to the face of a card comprising means for holding the card in a horizontal position face up with the object resting on and occupying a given area of the face of the card, means for releasably holding a length of tape in a horizontal position above the object adhesive side down, a vertically reciprocating tape applying plunger above the held length of tape, two vertically reciprocating tape threading plungers above the held length of tape positioned to pass downwardly on each side respectively of the said area to points below the card, means for moving the applying plunger downwardly to press the central portion of the length of tape into engagement with the object and for moving the threading plungers downwardly to conduct the two end portions of the length on each side respectively of the said area to points below the card, a pair of tape wiping members below the card, and means for moving the wiping members to adhere the two end portions of the length to the back surface of the said area of the card.

2. In an apparatus for applying tape to articles, a platform for supporting the article, an endless tape conveyor of open work construction mounted with an operating run movable over the article on said platform, said conveyor including transverse tape supporting members spaced in the direction of conveyor travel, means for intermittently advancing the conveyor to present a section of tape over the article, and tape applying means including tape folding members movably mounted adjacent the operating run of the conveyor, and operating means for moving said members into and out of the open spaces of the conveyor to fold the tape around the article.

3. In a tape applying apparatus the combination of means for supporting an article in a tape applying position, a feeding means for advancing the forward end of a continuous strip of tape to position the forward section over the article in said position, said feeding means embodying a succession of movable spaced serrated edge blades for entraining the tape to feed it, a tape folding means including a spring pressed plunger movable to compress the forward section of the tape against the article, and an element movable thereafter against the tape between the clamped portion and the next succeeding said blade thereby to cause the tape to be severed at the latter, and means for completing the folding of the severed tape section upon the article.

4. In a tape applying apparatus the combination of means for supporting an article in a tape applying position, a feeding means for advancing the forward end of a continuous strip of tape to position the forward section over the article in said position, said feeding means embodying a succession of movably spaced elements adapted to entrain the tape to feed it, a tape folding means including a spring pressed plunger movable to compress the forward section of the tape against the articles, and a pair of spaced members and means for operating them to engage respectively the tape at each side of said plunger said elements embodying a severing edge whereby said engagement of the tape causes the forward section of the tape to be severed at the element rearwardly of the article.

5. In an apparatus for applying tape to articles, tape feeding means for intermittently advancing the tape, means for folding tape on the article, a first pulley and connections for rotating it in the operation of said folding means, a second pulley, a one way clutch mechanism connecting said second pulley and said tape feeding means, a spring connected to urge said pulley in the clutch effective direction to drive said feeding means, a flexible connection between said two pulleys for rotating said second pulley in the clutch free running and spring tensioning direction by said rotation of the first pulley, and means for releasing the driving connection between said folding means and the first pulley at a predetermined point in the cycle thereby to permit said spring to effect an advance of the tape.

6. In an apparatus for applying adhesive tape sections to an article the combination of, a support having a position for the article, a pair of spring pressed folding elements mounted on said support below the article position, means for positioning a section of the tape over the article, a spring urged presser means operable to compress the tape onto the article, and movably mounted spaced folding members including means for operating them operable thereafter to engage and fold the extending end portions against the article, said members being movable in their continued advance into engagement with and adapted to displace said elements and then to be withdrawn whereby the said folding elements are permitted to return and fold down the end portions of the tape.

7. In an apparatus for applying adhesive tape sections to an article the combination of, a support means for fastening the article, a pair of opposed hinged doors mounted on said support below the article position and normally spring pressed to closed position, means for positioning a section of the tape over the article, a spring urged presser means operable to compress the tape onto the article, movably mounted spaced folding blades and means for moving them endwise to engage and fold the extending end portions against the article, said blades being movable in their continued advance into engagement with and adapted to displace said doors and then to be withdrawn whereby the said doors are permitted to return and fold down the end portions of the tape, one of said blades being shorter than the other and the corresponding door being shorter than the other door whereby said doors return sequentially and the said end portions of the tape are folded down sequentially with their ends overlapped.

8. In an apparatus for applying adhesive tape sections to an article the combination of, a supporting table having a position for the article, a pair of spring pressed folding elements movably mounted on said support below the article position, means for positioning a section of tape over the article, a movable tape applying head mounted for reciprocative movement toward and away from the article, a pair of spaced folding blades mounted on said head extending in the direction of said reciprocative movement, a spring urged presser plunger mounted in said head intermediate of said blades, spring means for urging said head to a retracted position, other means for moving said head toward the article to cause said presser plunger initially to engage and elastically compress the tape section onto the article, and said blades in the continued advance of the head engaging and folding the extending portions of the tape against the article, and also engaging and displacing said elements, and said elements upon the withdrawal of the blades being permitted to return and fold down the end portions of the tape.

9. In an apparatus for applying tape to articles the combination of, supporting means for the article, means for positioning a section of tape adjacent the article, and a tape applying means movably mounted adjacent the article position embodying a folding member provided with spaced fingers defining a notch of at least the width of the tape, said member being movable to engage the tape flatwise in said notch and to push the tape around the article as the tape is guided in and slides through said notch.

10. In an apparatus for applying tape to articles the combination of, supporting means for the article, means for positioning a section of tape adjacent the article, and a tape applying means movably mounted adjacent the article position embodying a pair of spaced folding members, and elastic means located between said members movable to compress the tape onto the article, said members each having a tape engaging end provided with a notch adapted to receive therein tape portions extending at each side of the article and to fold the portions down by the advancing movement of the members with the tape portions sliding through and guided in the notch.

11. In an apparatus for applying tape to articles the combination of, supporting means for the article, a pair of spring pressed folding elements mounted on said support below the article position thereon, means for positioning a section of tape over the article with portions extending at each side thereof, and a pair of folding blades movably mounted on said support movable endwise into engagement with said portions respectively said blades each being provided with forward end fingers defining a tape receiving notch therebetween, at least one of the fingers of a blade being adapted in its forward movement to engage and displace the corresponding said folding element with the tape portion engaged in and sliding through the corresponding blade notch, and upon withdrawal of the blades said elements being permitted to return and operating to fold down the extreme end parts of the tape.

12. In an apparatus for intermittently feeding tape, a conveyor means adapted to entrain and advance the tape, an operating means therefor embodying a movable operating element, a one way clutch mechanism including a driving member and a driven member, a connection from said element for operating said driving element in its overrunning direction, a spring connected to be tensioned thereby, a connection from said driven clutch member for operating said conveyor, and means in said connection to said driving member for releasing the latter at a predetermined point in the cycle whereby said spring rotates the driving member in the effective direction to operate said driven member and thereby advance the conveyor a predetermined distance.

13. The method of applying from a roll thereof sections of pressure sensitive adhesive tape to articles which includes the steps of drawing the tape from the roll by spaced supports embodying tape severing edges and positioning the forward section suspended between two such supports over the article, compressing the section upon the article and severing the forward section from the roll by impinging upon the tape between the area compressed upon the article and the succeeding adjacent support.

14. The method of applying from a continuous length thereof sections of pressure sensitive tape to articles which includes the steps of advancing the tape by spaced supports each having saw tooth edges projecting upwardly from the surface of the supports extending transversely of the tape advance upon which the tape is entrained, positioning the forward section of tape suspended between two such supports over the article, compressing the section upon the article, and folding down the tape at each side of the article by downwardly moving fingers, one such finger serving to impinge upon the tape between the area compressed upon the article and the succeeding adjacent support, and thereby to part the forward section upon the succeeding adjacent saw tooth edge.

References Cited in the file of this patent

UNITED STATES PATENTS

| | | |
|---|---|---|
| Re. 23,088 | Loeb | Mar. 8, 1949 |
| 1,216,612 | Powers | Apr. 2, 1918 |
| 1,687,881 | Myers | Oct. 16, 1928 |
| 2,109,527 | Fenton | Mar. 1, 1938 |
| 2,232,783 | Hausheer | Feb. 25, 1941 |
| 2,241,658 | Engberg | May 13, 1941 |
| 2,617,198 | Sharpe | Nov. 11, 1952 |
| 2,667,019 | Feyrer | Jan. 26, 1954 |